United States Patent [19]

Elepano

[11] Patent Number: 5,141,555
[45] Date of Patent: Aug. 25, 1992

[54] BUFFING COMPOSITION

[75] Inventor: Normita P. Elepano, Woodbury, Minn.

[73] Assignee: Minnesota Mining and Manufacturing Company, St. Paul, Minn.

[21] Appl. No.: 785,079

[22] Filed: Oct. 30, 1991

Related U.S. Application Data

[60] Division of Ser. No. 496,102, Mar. 16, 1990, Pat. No. 5,094,687, which is a continuation of Ser. No. 311,136, Feb. 15, 1989, abandoned.

[51] Int. Cl.$^5$ ................................................ C09G 1/02
[52] U.S. Cl. ........................................... 106/10; 106/3; 427/142
[58] Field of Search .................... 106/10, 3; 427/142

[56] References Cited

U.S. PATENT DOCUMENTS

| | | | |
|---|---|---|---|
| 1,965,299 | 7/1934 | Patterson | 51/280 |
| 2,436,128 | 2/1948 | Twyning et al. | 51/305 |
| 2,548,582 | 4/1951 | Boak | 51/304 |
| 2,597,871 | 5/1952 | Iler | 106/10 |
| 2,804,440 | 8/1957 | Brown | 260/28 |
| 2,829,035 | 4/1958 | Doughty et al. | 51/304 |
| 2,949,374 | 8/1960 | Kendall | 106/10 |
| 2,980,524 | 4/1961 | Morton | 51/293 |
| 3,042,509 | 7/1962 | Soderberg | 51/305 |
| 3,071,479 | 1/1963 | Fulenwider | 106/10 |
| 3,141,273 | 7/1964 | Sarofeen | 51/284 |
| 3,243,310 | 3/1966 | Hull et al. | 106/10 |
| 3,964,913 | 6/1976 | Nighy | 106/10 |
| 4,347,333 | 8/1982 | Lohr et al. | 524/269 |

FOREIGN PATENT DOCUMENTS

| | | |
|---|---|---|
| 929291 | 6/1973 | Canada . |
| 1419964 | 2/1972 | Fed. Rep. of Germany ........ 106/10 |
| 712431 | 1/1980 | U.S.S.R. ................. 106/10 |
| 1221739 | 2/1971 | United Kingdom . |

OTHER PUBLICATIONS

Finesse-it ™ Brochure/3M.
European Search Report.
Defensive Publication T892,004, Hagemeyer, Jr. et al.

Primary Examiner—Mark L. Bell
Assistant Examiner—Deborah Jones
Attorney, Agent, or Firm—Gary L. Griswold; Walter N. Kirn; David L. Weinstein

[57] ABSTRACT

A buffing composition for imparting very fine finishes to automobile surfaces. The buffing composition contains non silicone-containing materials and comprises alumina abrasive and a synthetic wax dispersed in a liquid medium. The liquid medium can be a solvent, water, a hydrocarbon oil, or mixtures thereof. The buffing composition can optionally contain other additives or modifiers such as wetting agents, thickeners, stabilizers, preservatives, emulsifiers, dyes, pigments and perfumes.

2 Claims, No Drawings

BUFFING COMPOSITION

BACKGROUND OF THE INVENTION

This is a divisional application of U.S. application Ser. No. 07/496,102, filed Mar. 16, 1990, U.S. Pat. No. 5,094,687, which is a continuation of U.S. application Ser. No. 07/311,136, filed Feb. 15, 1989 and now abandoned.

1. Field of the Invention

This invention relates to a buffing composition, and, in particular, to a composition that imparts a very fine finish to automobile surfaces. 2. Discussion of the Art In the 1980's, automobile manufacturers began using a base coat/clear coat paint system for automotive surfaces. The base coat imparts the desired color and the clear coat, which is applied over the base coat, is a transparent, hard, chip-resistant, protective coat. This paint system magnifies painting defects in either the base coat or the clear coat. If the defects cannot be corrected on the assembly line, the automobile must be removed from the line, the defects removed, and the automobile then repainted. This procedure results in a considerable loss of time, and consequently, money for the automobile manufacturer. Minnesota Mining and Manufacturing Company, the assignee of the present application, has developed a system used by automobile manufacturers to remove paint defects on the assembly line. The system, known as the "Finesse-it" system, first utilizes a sanding step, employing very fine coated abrasives, to smooth out the defect. Next, the defect is buffed with "Finesse-it" brand finishing material (a buffing composition) to remove the scratches produced by the coated abrasives. Finally, the residue from the finishing material is removed with a cotton cloth, thereby producing a uniform, glossy finish. An optional step is to polish the surface after buffing to impart an even finer finish to the painted automobile surface. The "Finesse-it" system has had wide-spread success in automobile manufacturing plants, except in the finishing of dark colored paints. The "Finesse-it" finishing material (the buffing composition) tends to leave a faint white "spider-web" scratch or a milky haze on the painted surface where the defect was repaired. It would be desirable to use a buffing composition that does not produce haze marks, so that paint defects can continue to be removed on the assembly line.

In addition, automobile manufacturers require that the buffing compositions contain no silicone-containing materials. When silicone-containing materials are utilized in a buffing composition, a residual layer of silicone is left on the painted surface. When the clear coat is applied to this surface, or if the surface is repainted, the residual silicone prevents the paint from evenly spreading across the surface, thereby resulting in serious defects in the painted surface.

Buffing compositions, or polishing compositions, generally comprise very fine abrasive particles suspended in a liquid medium. For example, U.S. Pat. No. 2,597,871 and British patent specification 1,221,739 disclose polishing compositions comprising polyethylene wax and silica.

U.S. Pat. Nos. 2,804,440; 2,949,374; and 4,347,333 and Canadian patent 929291, disclose buffing compositions comprising a synthetic wax, a silicone compound, and abrasive particles.

In general, silicones are preferred in buffing compositions because they increase the water resistance, increase the gloss, improve the workability of the buffing composition, and lower the surface tension of the buffing composition. However, as discussed previously, automobile manufacturers refuse to employ buffing compositions that contain silicone-containing materials.

SUMMARY OF THE INVENTION

The present invention provides a silicone-free buffing composition comprising alumina abrasive, a synthetic wax, a liquid medium, and, optionally, other additives. The synthetic wax is preferably selected from polymethylene, polyethylene, or polypropylene wax. The liquid medium is preferably selected from an organic solvent, water, hydrocarbon oil, or mixtures thereof. When this buffing composition is applied to the painted surface of an automobile, it removes haze marks left by previously used buffing compositions and leaves a uniform glossy finish which matches the painted surface of the automobile surrounding the defect. Thus, paint defects can be totally corrected and returned to their original finish and gloss without having to remove the automobile from the assembly line.

DETAILED DESCRIPTION

The buffing composition of this invention comprises an alumina abrasive, a synthetic wax, a liquid medium, and, optionally, other additives. The alumina abrasive and synthetic wax are dispersed in the liquid medium to form the buffing composition. Additives or modifiers can be employed to adjust the properties of the buffing composition. Suitable additives include wetting agents, thickeners, stabilizers, preservatives, emulsifiers, waxes, dyes, pigments, and perfumes.

The abrasive material is alumina. It has been discovered that alumina is the only abrasive material that can be used in this buffing composition that will produce a haze free surface. The alumina is present in the buffing composition as a multiplicity of abrasive particles. The size of the abrasive particles is critical. In general, the average particle size should be less than about 20 micrometers, preferably, less than about 12 micrometers, more preferably, less than about 6 micrometers. The particle size distribution should be fairly narrow so that the buffing composition does not produce any undesired scratches.

The synthetic wax is a hydrocarbon wax material formed from the poymerization of monomers. The synthetic wax is similar to a natural wax in that it is a plastic solid at ambient temperature, and upon exposure to moderately elevated temperatures, it becomes a liquid of low viscosity. Typical examples of synthetic waxes include polymethylene wax polyethylene wax, and polypropylene wax. The preferred synthetic wax of the present invention is polyethylene wax. Polymethylene wax is white in color and is relatively hard. It has a melting point between 95 to 100° C. and a molecular weight ranging from about 600 to about 950. Polyethylene wax has a molecular weight ranging from about 2000 to about 4000 and a specific gravity ranging from abut 0.91 to about 0.96.

It is preferable to employ the synthetic wax as an emulsion of the wax for ease of mixing the buffing composition, reduced toxicity, and reduced flammability. The emulsion generally consists of small wax particles dispersed in a liquid medium, usually water, with an appropriate emulsifier. In general, the wax particles should be small, preferably less than 100 micrometers.

The distribution of particle sizes should be narrow. For a typical emulsion, the percent solids of the wax can be in the range of about 5 to about 40% by weight, preferably 15 to 30% by weight. A typical emulsion of a polyethylene wax is commercially available from S. C. Johnson & Son, Inc. under the trade designation "Jonwax ®26"; a typical emulsion of a polypropylene wax is commercially available from Michelman Inc. under the trade designation "Michem Emulsion 43040".

The third major component in the buffing composition is a liquid medium. The alumina abrasive particles and the synthetic wax are dispersed in the liquid medium to form the buffing composition. The liquid medium can be a hydrocarbon solvent, water, a hydrocarbon oil, or mixtures thereof. If the liquid medium is too volatile, it will evaporate prematurely and will not allow sufficient time for the buffing composition to spread across the painted surface. If the liquid medium has too low a volatility, drying will be retarded, thereby increasing the working time of the buffing composition.

If the solvent is the liquid medium, it should have a distillation range of from about 85° C. to about 260° C., and a flash point of from about −20° C. to about 80° C. Representative solvents include aliphatic hydrocarbons, isoparaffinic hydrocarbons, naphtha, Stoddard solvent, kerosene, turpentine, cycloaliphatic hydrocarbons, mineral spirits, methyl ethyl ketone, and mixtures thereof. The preferred solvent are Stoddard solvent and mineral spirits.

If water is the liquid medium, it can be tap water, distilled water, or deionized water. Deionized water is preferred because the likelihood of bacterial growth is reduced due to the removal of ions and other materials which would promote microbial growth in the buffing composition.

The hydrocarbon oil can be a petroleum oil, a vegetable oil, or a mineral oil. Representative examples of such oils include fish, tallow, cottonseed, soybean, tall, castor, and mineral oil. The preferred oil is mineral or castor oil, most preferably mineral oil.

It is preferable to use a mixture of an organic solvent, water, and a hydrocarbon oil as the liquid medium.

Wetting agents, or surfactants, can be added to the composition to better disperse the ingredients therein. In addition, it will lower the overall surface tension of the buffing composition, which results in better wetting out of the buffing composition on the painted surface. In general, any type of wetting agent, i.e., anionic, cationic, nonionic, amphoteric, zwitterionic, etc., can be employed in the buffing compositions.

Thickeners can be sometimes added to increase and adjust the viscosity of the buffing composition. If the viscosity of the buffing composition is too low, it tends to run down the vertical surfaces of the automobile, and consequently, the operators cannot properly buff with it. Therefore, thickeners are utilized to adjust the viscosity of the buffing composition. Typical examples of thickeners include hydrous aluminum silicate, a dimethyldioctadecyl salt of montmorillonite clay, an alkali soluble acrylic polymer emulsion, colloidal silica, heavy metal soaps such as lead oleate, zinc oleate, zinc stearate, and aluminum stearate. The preferred thickener for use with the present invention is an aqueous alkali soluble acrylic polymer emulsion.

Stabilizers and preservatives can be employed to inhibit bacterial growth in the buffing composition. Typical examples include methyl paraben, ethyl paraben, propyl paraben, butyl paraben, potassium sorbate, sorbic acid, and o-phenylphenol.

Pigments, dyes, and perfumes can also be added to the buffing composition of the invention as desired.

Non-synthetic waxes can be added to the composition to adjust the final properties of the buffing composition. These properties include surface tension, viscosity, buffing composition workability, gloss, and water resistance. Typical examples of such non-synthetic waxes are beeswax, spermaceti, vegetable, candelilla, carnauba, Japan, ouricury, rice-bran, montan, peat, paraffin, and other naturally occurring microcrystalline and semimicrocrystalline waxes.

During the preparation of the buffing composition, it is preferable to add the abrasive particles as a dispersion, for ease of mixing. In general, the abrasive particles are added to water or another solvent with an appropriate coupling agent or suspending agent to form the dispersion. A typical dispersion will contain less than 70% solids by weight alumina abrasive, with the remainder being the liquid and suspending aid.

The concentration ranges of the various components can vary, but preferably range from 1 to 45% by weight, more preferably 5 to 30% by weight, abrasive grain; 1 to 30% by weight, more preferably 5 to 20% by weight, synthetic wax; zero to 30% by weight, more preferably 2 to 15% by weight, additives or modifiers, the remainder being the liquid medium.

The following non-limiting examples will further illustrate the invention.

Buffing compositions were prepared according to the following examples and tested according to the procedure outlined below. In all of the examples, the buffing composition was mixed to form a homogeneous dispersion with a high shear mixer. The general order of addition in preparing the buffing composition was water, preservatives, wetting agents, wax, mineral oil, solvent, thickeners, and the abrasive. The mixture was continuously stirred as the various ingredients were added. The percentages of the various ingredients were based upon weight. All of the test results can be found in Table 1.

Test Procedure

Panel Preparation

The first step of the test procedure was to generate haze marks on a metal test panel painted with a black colored base coat and a clear top coat. A grade 1500 "Finesse-it" Micro Fine sanding disc, available from Minnesota Mining and Manufacturing Company, St. Paul, Minn., was attached to a "Finesse-it" hand sanding pad, also available from Minnesota Mining and Manufacturing Company. The disc was used to sand a 4 cm diameter round spot in the painted test panel. The sanding was done with a circular motion and approximately four drops of water were added to the sanding interface as a lubricant. The sanding step simulated the removal of a paint defect, and accordingly left on the painted surface sand scratches. Then the painted panel was wiped dry with a cotton cloth.

Next, a 1.5 cm diameter drop of "Finesse-it" finishing material, available from Minnesota Mining and Manufacturing Company, was applied to the sanded area. A "Finesse-it" buffing pad and a "Finesse-it Roloc" finishing pad, both available from Minnesota Mining and Manufacturing Company, were secured to a rotary sander buffing tool. If the buff pad was new, a 2.0 cm diameter drop of the finishing material was applied to the buffing pad. Then the buffing pad was placed on top of the sanded area and the finishing material was spread over this area before the tool was started. The tool was turned on and the sanded area was buffed for eight seconds as very firm pressure was applied to the tool. After the eight second period, the pressure was reduced, and the spot was polished for an additional three seconds. At this point, a haze was generated on the surface and was especially visible under sodium vapor light. The sanding and buffing steps were repeated three additional times at different areas on the test panel so that the average test value was based upon four readings.

Haze Removal Test

A "Finesse-it" polishing pad, available from Minnesota Mining and Manufacturing Company, was secured to a random orbital sander (Hutchins Manufacturing Company), which could be operated at 10,000 rpm. A new polishing pad was employed for each example and was used to polish the four hazed test areas. On the first test area, i.e., where the polishing pad was new, the pad was conditioned by being saturated with the particular buffing composition of the example. A 1.5 cm diameter drop of each of the buffing compositions prepared according to the following examples was applied to the hazed surface. The tool was started, and the hazed area was polished for eight seconds, with very firm pressure being applied to the tool. The pressure was then reduced and the area was polished for an additional three seconds. Next the test area was cleaned with a 50/50 mixture of isopropyl alcohol and water and a clean cotton cloth. After the other three hazed areas were polished using the same procedure as above, the test panel was examined under sodium vapor light for any additional haze marks. The test panel was given a rating between 0 to 10, 10 being the best, where no haze was present, and 0 being the worst.

CONTROL EXAMPLE 1

In this example, which simulated conventional procedures in automobile manufacturing plants prior to the present invention, only the panel preparation procedure was completed; the haze removal test was not completed.

CONTROL EXAMPLE 2

In this example, the buffing composition utilized in the haze removal test was "Finesse-it" finishing material, available from Minnesota Mining and Manufacturing Company.

EXAMPLE 1

The buffing composition for this example contained the following ingredients: 57.75% deionized water; 0.54% triethanolamine; 2% glycerin; 0.05% propyl paraben, a preservative; 0.10% methyl paraben, a preservative; 11% emulsion of polyethylene wax (Jonwax ®26, purchased from S. C. Johnson & Son, Inc.); 1.35% thickening agent (an aqueous alkali soluble acrylic polymer emulsion); 6% mineral oil ("Parol 70", purchased from Penreco Company); 14% Stoddard solvent, 0.30% wetting agent (a polycarboxylic acid salt); and 6.91% alumina abrasive having a particle size in the range of 2 to 5 micrometers.

EXAMPLE 2

The buffing composition for this example contained the following ingredients: 37.86% deionized water; 0.54% morpholine; 2% glycerin; 0.05% propyl paraben, a preservative; 0.10% methyl paraben, a preservative; 11% emulsion of polyethylene wax (Jonwax ®26, purchased from S. C. Johnson & Son, Inc.); 1.65% thickening agent (an aqueous alkali soluble acrylic polymer emulsion); 6% mineral oil ("Parol 70", purchased from Penreco Company); Stoddard solvent; 0.30% wetting agent (a polycarboxylic acid salt); and 26.5% alumina abrasive dispersion, the alumina abrasive having a particle size in the range of 1 to 5 micrometers.

EXAMPLE 3

The buffing composition of this example was made according to the procedure used in Example 2, except that the polyethylene wax was replaced with an equal amount of a polypropylene wax in an emulsion form.

COMPARATIVE EXAMPLE A

The buffing composition of this example was made according to the procedure used in Example 2, except that the polyethylene wax was replaced with an equal solids amount of carnauba wax. The carnauba wax consisted primarily of aliphatic and aromatic esters.

COMPARATIVE EXAMPLE B

The buffing composition of this example was made according to the procedures used in Example 2, except that the percentage of the polyethylene wax was reduced to zero and the percentage deionized water was increased to 48.86%.

COMPARATIVE EXAMPLE C

The buffing composition of this example was made according to the procedure used Example 2, except that the aluminum oxide abrasive was replaced with an equal amount of silica. The silica ("Kaopolite 1168", purchased from Kaopolite Inc.) had a particle size in the range of 1 to 5 micrometers.

COMPARATIVE EXAMPLE D

The buffing composition of this example was made according to the procedure used in Example 2, except that the percentage of the alumina abrasive was reduced to zero and the percentage of deionized water was increased to 64.36%.

COMPARATIVE EXAMPLE E

The buffing composition of this example was made according to the procedure used in Example 2, except that the alumina abrasive was replaced with an equal amount of cerium oxide ("Cerox 1650", purchased from Optical Manufacturers International Limited.)

COMPARATIVE EXAMPLE F

The buffing composition of this example was made according to the procedure used in Example 2, except that the alumina abrasive was replaced with an equal amount of a silicon carbide abrasive ("Fujime 6,000", purchased from Fujime, Inc.). The silicon carbide abrasive had an average particle size of 2 micrometers.

EXAMPLE 4

The buffing composition of this example was made according to the procedure used in Example 2, except that the percentage of polyethylene wax was decreased to 5.5% and the percentage deionized water was increased to 43.36%.

EXAMPLE 5

The buffing composition of this example was made according to the procedure used in Example 2, except that the percentage of polyethylene wax was increased to 15.3% and the percentage of deionized water was decreased to 33.56%.

EXAMPLE 6

The buffing composition of this example was made according to the procedure used in Example 2, except that the percentage of wetting agent was reduced to zero and the percentage of deionized water was increased to 38.16%.

EXAMPLE 7

The buffing composition of this example was made according to the procedure used in Example 2, except that the percentage of the alumina abrasive was reduced to 10% and the percentage of deionized water was increased to 54.36%.

EXAMPLE 8

The buffing composition of this example was made according to the procedure used in Example 2, except that the percentage of the alumina abrasive was increased to 40% and the percentage of deionized water was decreased to 24.36%.

EXAMPLE 9

The buffing composition of this example was made according to the procedure used in Example 2, except that the percentage of the mineral oil was reduced to zero and the percentage of deionized water was increased to 43.86%.

EXAMPLE 10

The buffing composition of this example was made according to the procedure used in Example 2, except that the percentage of mineral oil was reduced to 3% and the percentage of deionized water was increased to 40.86%.

EXAMPLE 11

The buffing composition of this example was made according to the procedure used in Example 2, except that the percentage of mineral oil was increased to 10.48% and the percentage of deionized water was decreased to 33.38%.

TABLE 1

| Example No. | Rating |
|---|---|
| Control 1 | 1 |
| Control 2 | 5 |
| 1 | 8 |
| 2 | 10 |
| 3 | 9 |
| A (Comparative) | 5 |
| B (Comparative) | 5 |
| C (Comparative) | 0 |
| D (Comparative) | 2 |
| E (Comparative) | 5 |
| F (Comparative) | 0 |
| 4 | 7 |
| 5 | 6 |
| 6 | 6 |
| 7 | 6.5 |
| 8 | 7.5 |
| 9 | 9 |
| 10 | 7 |
| 11 | 8 |

A rating of 6 or greater for the buffing composition would render the composition satisfactory for use in automobile manufacturing plants. In comparing the compositions of Example 2 and 3 with the compositions of Comparative Examples A and B, it can be seen that the use of synthetic waxes significantly improves the performance of the buffing composition. In comparing the composition of Example 2 with the composition of Comparative Examples C, D, E, and F, it can be seen that compositions containing alumina abrasive significantly outperform compositions containing abrasives other than alumina.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. In a method for removing haze marks from a painted surface by applying a composition to a painted surface and buffing said painted surface until said haze marks are removed, the improvement wherein the composition is silicone-free and comprises:
    (a) from 1 to 45% by weight of an alumina abrasive having an average particle size of less than about 20 micrometers,
    (b) from 1 to 30% by weight of a synthetic wax, and
    (c) from 25 to 98% by weight of a liquid medium in which the abrasive and the wax are dispersed.

2. The method of claim 1, wherein said painted surface is the painted surface of an automobile.

* * * * *

UNITED STATES PATENT AND TRADEMARK OFFICE
CERTIFICATE OF CORRECTION

PATENT NO. : 5,141,555
DATED : Aug. 25, 1992
INVENTOR(S) : Elepano

It is certified that error appears in the above-indentified patent and that said Letters Patent is hereby corrected as shown below:

On the title page:

Abstract line 27, delete "tains non silicone-containing" and insert --tains no silicone-containing--.

Column 6, line 11, delete "; Stoddard" and insert --; 14% Stoddard--.

Signed and Sealed this

Fourth Day of April, 1995

Attest:

BRUCE LEHMAN

Attesting Officer

Commissioner of Patents and Trademarks